March 1, 1938.  J. KIRGAN  2,109,885

EVAPORATOR

Filed Feb. 19, 1937

INVENTOR
John Kirgan.
BY
HIS ATTORNEY

Patented Mar. 1, 1938

2,109,885

UNITED STATES PATENT OFFICE 2,109,885

EVAPORATOR

John Kirgan, Easton, Pa., assignor to Ingersoll-Rand Company, Jersey City, N. J., a corporation of New Jersey Application February 19, 1937, Serial No. 126,681

4 Claims. (Cl. 62—126)

This invention relates to evaporators, but more particularly to devices for effecting agitation of fluid undergoing vaporization in an evaporator.

Although not limited to such use, the invention is particularly useful with evaporators of water-vapor refrigerating systems. In such systems, water is chilled in a vacuum by partial vaporization, and the efficiency of the chilling process is to a large extent determined by the manner in which the liquid is presented to the action of the vacuum for vaporization. A large mass of unbroken liquid presents a relatively small surface area, as compared to its volume, to the action of the vacuum and does not vaporize and chill rapidly or easily. On the other hand, liquid so finely divided as to form a mist is apt to be removed from the evaporator along with vapor.

Accordingly, an object of the invention is to obtain maximum vaporization of a liquid.

Another object of the invention is to expedite the vaporization of a liquid by effecting agitation of the liquid without causing the liquid to form a mist.

A further object of the invention is to improve the vaporization process by effecting exposure of substantially all of the liquid to the vaporizing action.

Other objects will be in part obvious and in part pointed out hereinafter.

Figure 1:
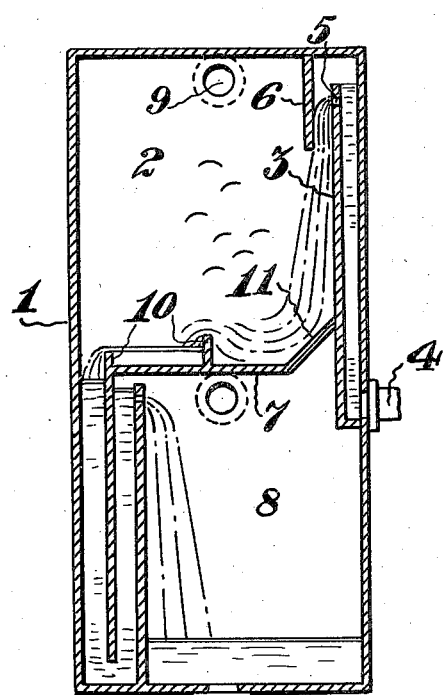
Figure 2:
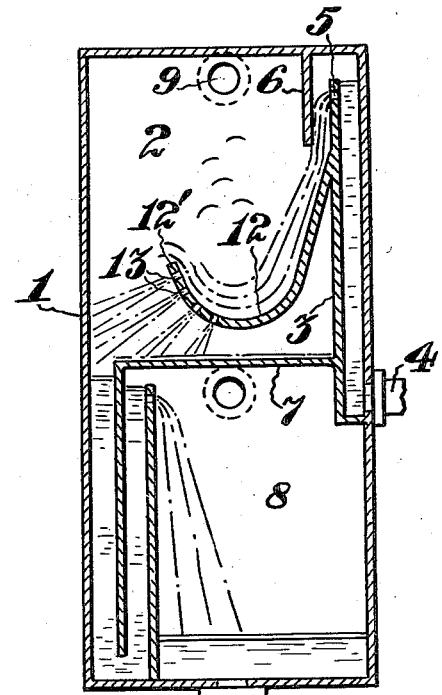
Figure 3:
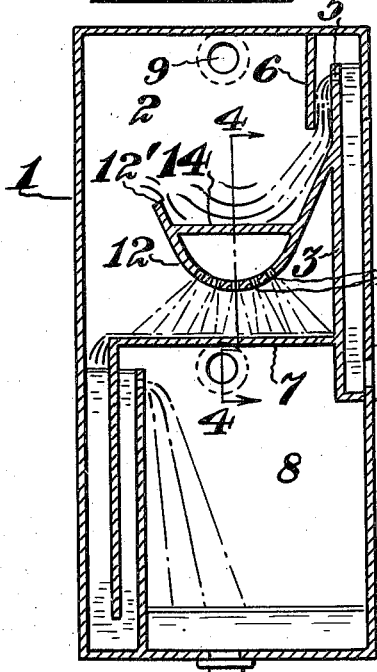
Figure 4:
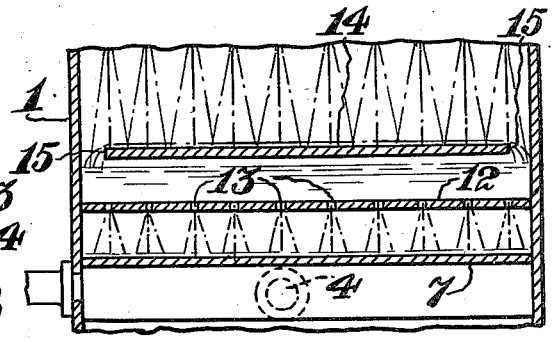

In the accompanying drawing in which similar reference numerals refer to similar parts, Figures 1, 2 and 3 show elevational views, in section, of evaporators constructed in accordance with the practice of the invention, and Figure 4 is a sectional view taken through Figure 3 on the line 4—4.

Referring more particularly to the drawing, the invention is shown embodied in an evaporator tank 1 having a vaporization chamber 2 therein.

The tank is equipped with inlet means for liquid, comprising a partition 3 positioned at one side of the tank to form an inlet well between itself and a side wall of the tank, and an inlet pipe 4 leads into the well. The partition 3 may form an over-flow means from the inlet well into the chamber 2, or suitable openings 5 may be made near the top of the partition leading from the well into the chamber. A baffle 6 may be provided adjacent the openings 5 to deflect liquid toward the bottom of the chamber 2.

The bottom of the chamber 2 is shown as being formed by a partition 7 below which is an outlet reservoir 8 for receiving liquid after treatment in the chamber 2. The tank is also provided with an outlet 9 for vapor from the chamber 2.

The structure thus far described is of a conventional type through which, as heretofore used, liquid flows without being greatly agitated and as a consequence of which, only a relatively small portion of the liquid is subjected to vaporization.

In accordance with the practice of this invention, devices are provided for disturbing or agitating the liquid during its passage through the vaporization chamber. Such devices employed in the embodiment of the invention illustrated in Figure 1, are in the form of baffles 10 mounted on the bottom 7 of the chamber 2 in the path of liquid flow. A portion 11 of the partition 7 is preferably inclined with respect to the remainder of the partition to deflect the liquid from its vertical course toward the baffle 10.

In the modified form of the invention shown in Figure 2, a horizontal trough 12 is positioned above the bottom 7 of the chamber 2. It extends the entire width of the tank 1 and its ends are closed by the end walls of the tank. One side of the trough is connected to the partition 3 and is inclined with respect to the partition to deflect liquid from its vertical course into the trough, and the other side of the trough which is distant from the partition 3, forms an over-flow means 12' into other parts of the chamber 2. A plurality of drain ports 13 are also provided in the trough and, in this instance, these ports are preferably positioned in that side of the trough which is distant from the partition 3.

The form of the invention illustrated in Figure 3 is somewhat similar to that shown in Figure 2 and also embodies a trough 12. In this instance, however, a horizontal partition 14 is positioned in the trough below the over-flow edge 12'. The partition preferably extends from one side of the trough to the other and, in effect, forms a second trough in the upper portion of the trough 12. The partition 14 is shown as being of somewhat less length than the trough 12 to form an over-flow edge 15 and to define a passage into the trough 12 at each end thereof.

The ports 13 for the trough 12 are in this instance, preferably positioned below the partition 14 and near the bottom of the trough.

If the tank 1 is the evaporator of a water vapor refrigerating system, a high vacuum will be maintained in the chamber 2 by an evacuator (not shown) connected to the outlet 9.

The operation of the devices is as follows: In Figure 1, the liquid falls from the openings 5 under the force of gravity until it strikes the oblique surface 11 by which the mass of liquid is broken up and deflected toward and against the surfaces of the baffles 10. Upon striking the baffles, further breaking up of the liquid occurs as its course of flow is again altered. Thus the liquid is repeatedly deflected from its course of flow as it proceeds through the chamber and is broken up into small masses which can be easily vaporized. The liquid is, however, under insufficient force to form a mist and entrainment of liquid in the vapor is thereby minimized.

In the structure shown in Figure 2, the liquid falls along the side of the trough 12 connected to the partition 3 and whirls around the trough into the openings 13 and over the edge 12'. It then falls from the openings and from the edge 12' into other parts of the chamber 2 and onto the bottom 7 thereof.

In the modified form in accordance with Figure 3, liquid falls onto the partition 14 by which it is deflected against the side of the trough and over the edge 12'. The liquid also spreads out over the surface of the partition and flows over the ends 15 into the trough 12, thence passing through the openings 13 onto the bottom 7 of the chamber.

In each instance, the liquid is repeatedly deflected from its course of flow and agitated. The liquid is broken up, but not sufficiently so as to form a mist. Considerable whirling of the liquid occurs which serves to raise its elevation and create a tumbling effect, and the turbulent conditions created throughout the liquid cause substantially all of the liquid to be quickly exposed to the vaporizing action. Thus a maximum amount of liquid may be vaporized efficiently and economically.

It will be understood that the foregoing disclosure is illustrative and that various changes as to size and form may be made without departing from the spirit and scope of the invention as defined in the hereinafter appended claims.

I claim:

1. In an evaporator tank having a vaporization chamber therein and a vapor outlet from the chamber, means for admitting liquid to the chamber, and partition means in the chamber over which the liquid flows from a higher to a lower and again to a higher elevation in the chamber thereby deflecting the liquid from one course of flow to another to produce a state of continuous turbulence in the liquid.

2. In an evaporator tank having a vaporization chamber therein and a vapor outlet from the chamber, means for admitting liquid to the chamber, and means defining a trough positioned in the chamber to receive the liquid at one side thereof and to deflect the liquid, by the force of its flow, in the trough to the opposite side thereof and into the region above the trough and into other parts of the chamber, thereby to agitate the liquid.

3. In an evaporator tank having a vaporization chamber therein and a vapor outlet from the chamber, means for admitting liquid to the chamber, a trough positioned in the chamber to receive, deflect and agitate the liquid, and the trough having openings therein and having over-flow means for deflecting the liquid to other parts of the chamber.

4. In an evaporator tank having a vaporization chamber therein and a vapor outlet from the chamber, means for admitting liquid to the chamber, a trough positioned in the chamber, the trough having openings therein and having over-flow means into other parts of the chamber, and means in the trough to agitate the incoming liquid by deflecting the same in part toward and over said over-flow means and in part into the trough and said openings.

JOHN KIRGAN.